Oct. 3, 1961     C. J. FINSTERWALDER     3,003,074
BRUSH HOLDER
Filed Nov. 6, 1958     2 Sheets-Sheet 1
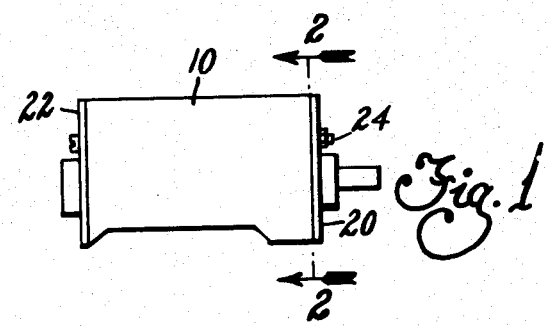
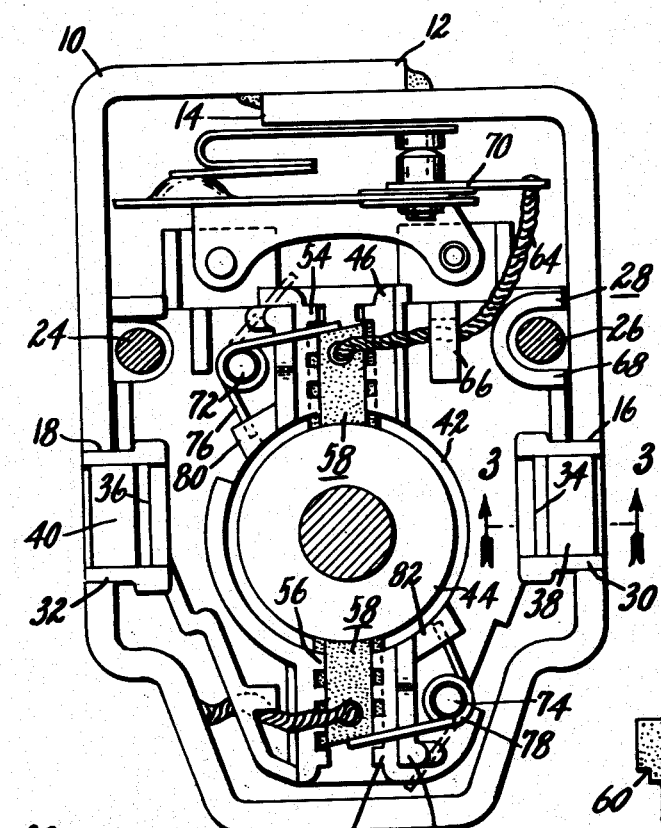
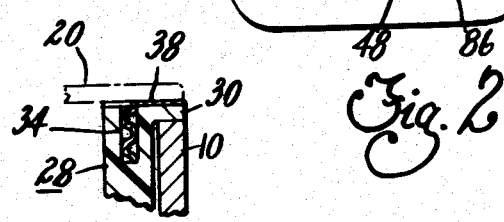
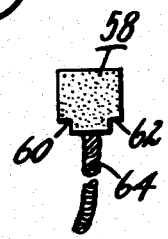
INVENTOR.
CARL J. FINSTERWALDER
BY
*W. E. Finken*
HIS ATTORNEY Oct. 3, 1961     C. J. FINSTERWALDER     3,003,074
BRUSH HOLDER
Filed Nov. 6, 1958     2 Sheets-Sheet 2
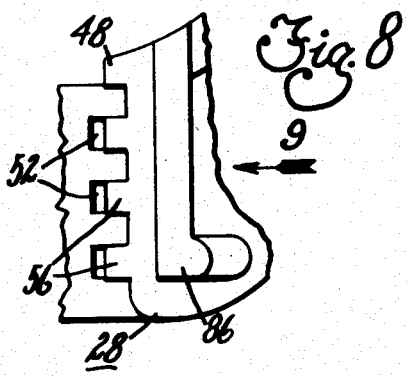
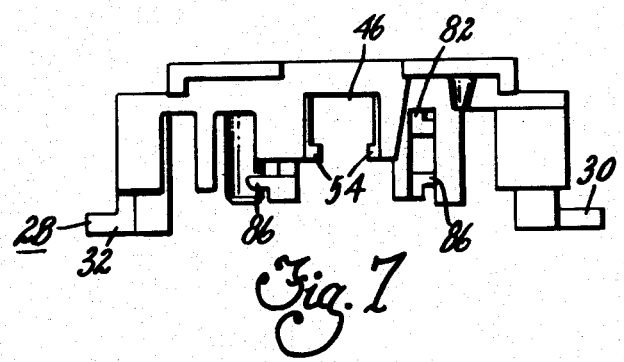
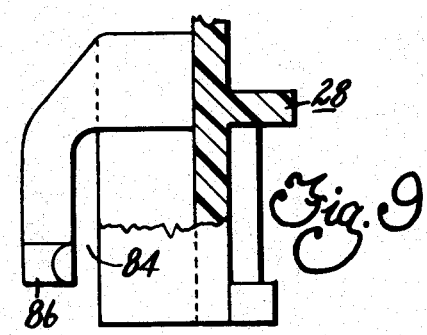
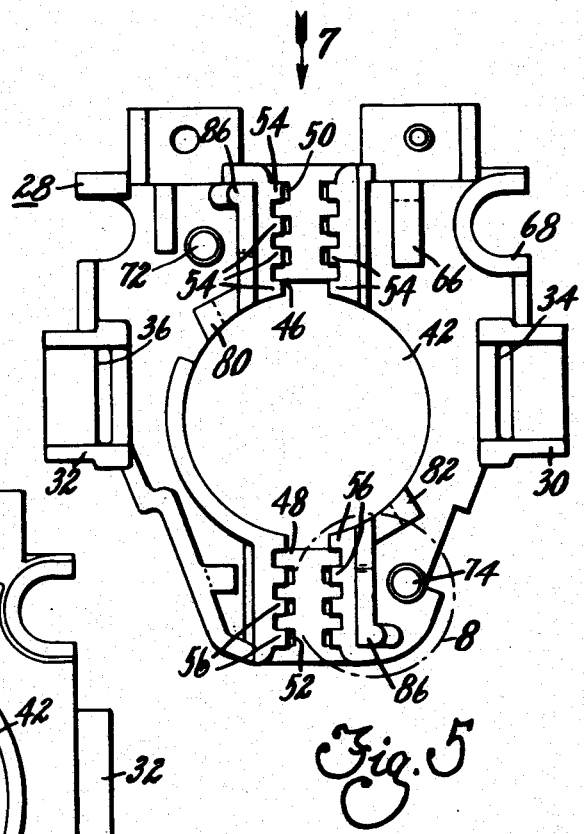
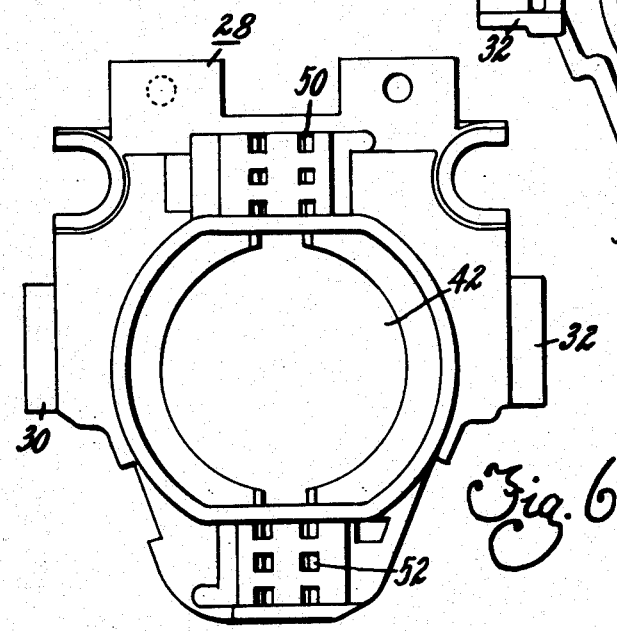
INVENTOR.
CARL J. FINSTERWALDER
BY
HIS ATTORNEY

United States Patent Office 3,003,074
Patented Oct. 3, 1961

3,003,074
BRUSH HOLDER
Carl J. Finsterwalder, Rochester, N.Y., assignor to General Motors Corporation, Detroit, Mich., a corporation of Delaware
Filed Nov. 6, 1958, Ser. No. 772,337
9 Claims. (Cl. 310—239)

This invention pertains to the art of dynamo electric machines, and particularly to a brush holder construction for electric motors.

Heretofore, it has been customary to utilize phenolic or other types of insulating material in the form of a plate to which metallic brush boxes are attached, in small direct current electric motors designed for automotive applications. However, this type of brush holder is quite expensive, and the present invention relates to a one-piece integrally molded brush plate and brush box assembly designed particularly for use in rectangular motors. Accordingly, among my objects are the provision of an integral brush plate and brush box assembly composed of insulating material; the further provision of an integral brush plate and brush box assembly having open ended brush boxes; the further provision of an integral plastic brush holder including baffles for precluding engagement of the brush shunt with the frame and tie bolts of the motor; and the still further provision of means for mounting an integral plastic brush plate and box assembly in a rectangular motor.

The aforementioned and other objects are accomplished in the present invention by utilizing a one-piece molded brush plate and box assembly which is clamped between the frame and the end plate of a motor, a pair of spring clips being interposed between the brush box holder and the end plate for applying pressure to the brush holder to maintain it in tight engagement with the motor frame. Specifically, the brush holder includes a plate having a centrally located cylindrical aperture for receiving the commutator, or collector portion, of the motor armature. A pair of diametrically opposed brush boxes are integrally formed with the brush plate, the brush boxes having open ends, latticed rear walls and substantially open front walls formed with a plurality of brush supporting fingers.

One side of each brush box is formed with a substantially radially extending slot for receiving the active end of a brush spring. This side of the brush box is also formed with an integral hook for maintaining the brush spring out of engagement with the brush during assembly and disassembly of the armature.

The integral brush holder is also formed with upstanding baffles which prevent engagement of the brush shunts with the frame and the tie bolts which hold the end caps in assembled relation with the motor frame. The brushes are nonrotatably supported in the brush boxes for reciprocable movement in a direction radial to the central aperture in the brush plate, and are formed with grooves in the front corners thereof which are supported by the fingers on the open front wall of the brush boxes.

In addition, the brush holder is formed with a pair of laterally extending lugs having axial slots in the adjacent portions thereof for receiving brush plate supporting springs, the ends of which overlie the ends of the laterally extending lugs. The laterally extending lugs are received in complementary notches in the frame, and the end plate is attached to the frame by tie bolts so that the brush plate springs exert pressure on the brush holder to maintain it tightly against the motor frame.

Further objects and advantages of the present invention will be apparent from the following description, reference being had to the accompanying drawings, wherein a preferred embodiment of the present invention is clearly shown.

In the drawing:
FIGURE 1 is a view in elevation of a rectangular motor embodying the brush holder of the present invention.
FIGURE 2 is a sectional view taken along line 2—2 of FIGURE 1.
FIGURE 3 is a fragmentary sectional view taken along line 3—3 of FIGURE 2.
FIGURE 4 is a plan view of one of the brushes.
FIGURE 5 is a front view of the integral brush holder.
FIGURE 6 is a rear view of the integral brush holder.
FIGURE 7 is a top view taken in the direction of arrow 7 in FIGURE 5.
FIGURE 8 is an enlarged view of a portion of one of the brush boxes taken within the circle 8 of FIGURE 5.
FIGURE 9 is a view taken in the direction of arrow 9 of FIGURE 8.

With particular reference to FIGURE 1, a rectangular motor of the general type disclosed in copending application Serial No. 680,238, filed August 26, 1957, in the name of Simmons et al. and assigned to the assignee of this invention is disclosed. The motor comprises a single piece sheet metal frame 10 which, as seen in FIGURE 2, has overlapping end portions 12 and 14 suitably secured together by welding. The commutator end of the frame is formed with a pair of notches 16 and 18 and the open ends of the frame are closed by end plates 20 and 22 which are held in assembled relation with the frame by a pair of tie bolts 24 and 26. The bearings, not shown, for rotatably supporting the armature shaft are carried by the end plates, and the armature shaft extends through an aperture in the commutator end plate 20.

With particular reference to FIGURES 2 and 3, an integral brush plate and brush box assembly 28 composed of insulating material is formed with a pair of laterally extending lugs, or projections 30 and 32 which are received in the notches 16 and 18 of the frame 10. The integral brush plate and brush box assembly, as seen in FIGURE 5, is formed with a pair of axially extending recesses 34 and 36 adjacent the laterally extending lugs 30 and 32 which receive the corrugated ends of the L-shaped brush plate springs 38 and 40, respectively. The free ends of springs 38 and 40 overlie the projections 30 and 32 and when the commutator end plate 20 is attached to the frame, pressure is exerted on the springs 38 and 40 so as to maintain the brush plate and brush box assembly 28 in tight engagement with the motor frame.

With reference to FIGURES 5 through 7, the integral brush plate and brush box assembly comprise a unitary element of molded plastic having a cylindrical aperture 42 for receiving the commutator, or current collector, 44 on the motor armature, as seen in FIGURE 2. A pair of diametrically opposed brush boxes 46 and 48 which extend substantially radially of the aperture 42 are formed as an integral part of the brush holder. The brush boxes 46 and 48 have open ends and latticed rear walls as indicated by the numerals 50 and 52, respectively. The front walls of the brush boxes are formed with a plurality of laterally projecting fingers 54 and 56, respectively, so as to accommodate a brush 58 of the configuration shown in FIGURE 4. Thus, each brush 58 is formed with a pair of grooves 60 and 62 in the front corners thereof and has attached thereto a conventional brush shunt, or pigtail, 64. Accordingly, the brushes are supported for reciprocable movement within the brush boxes while being restrained against rotation by virtue of the laterally projecting fingers 54 and 56.

The integral brush plate and brush box assembly 28 is formed with a pair of upstanding baffles 66 and 68 for precluding engagement of the pigtail with the tie bolts and motor frames. One of the brush pigtails is attached to a terminal of a thermal overload circuit breaker 70 as shown in FIGURE 2. The other brush pigtail is connected to the motor frame.

The integral brush plate and brush box assembly 28 is also formed with a pair of upstanding pins 72 and 74 for supporting torsion type brush springs 76 and 78 as seen in FIGURE 2. One end of the brush springs 76 and 78 is located behind lugs 80 and 82 of the brush plate, and the active ends of the brush springs 76 and 78 are either adapted to ride in radial slots 84 or engage a notched shoulder 86 so as to be disengaged from their respective brushes to facilitate assembly and disassembly of the armature with the motor frame. When the active ends of the brush springs are released from the shoulder 86 after assembly of the armature, they are guided for movement in a radial direction within the slots 84 and the L-shaped end portions of the active spring ends engage the outer ends of the brushes and urge them radially inward towards the commutator as seen in FIGURE 2.

While the embodiment of the invention as herein disclosed constitutes a preferred form, it is to be understood that other forms might be adopted.

What is claimed is as follows:

1. In a dynamo electric machine having a frame and a current collector member rotatably supported within said frame, an integral brush plate and brush box assembly of insulating material connected with said frame and having an opening therein to accommodate said current collector member, said assembly including an integral brush box with a substantially open front wall having laterally extending finger means, a brush mounted for reciprocable movement within said brush box having grooves formed in the corners on the front face thereof to receive said finger means, and means biasing said brush against said current collector member.

2. In a dynamo electric machine having a frame and a current collector member rotatably supported within said frame, an integral brush plate and brush box assembly of insulating material connected with said frame and having an opening therein to accommodate said current collector member, said brush plate and brush box assembly being substantially perpendicular to the axis of rotation of said current collector member and including a pair of integral brush boxes with substantially open front walls having laterally extending finger means, a pair of brushes mounted for reciprocable movement within said brush boxes, each brush having a groove formed in each corner of the front face thereof to receive said finger means, and means biasing said brushes against said current collector member.

3. In a dynamo electric machine having a frame and a pair of end plates secured to said frame, a current collector member rotatably supported within said end plates, an integral brush plate and brush box assembly of insulating material clamped between one of said end plates and said frame and having an opening therein to accommodate said current collector member, said assembly including an integral brush box with a substantially open front wall having laterally extending finger means, a brush mounted for reciprocable movement within said brush box having grooves formed in the corners on the front face thereof to receive said finger means, and means biasing said brush against said current collector member.

4. In a dynamo electric machine having a frame and end plates secured to said frame and a current collector member rotatably supported within said end plates, a one-piece molded insulating member clamped between one of said end plates and said frame and having an opening therein to accommodate said current collector member, said member having a pair of integral brush boxes connected with said opening, each brush box having a substantially open front wall with laterally extending finger means, a brush mounted for reciprocable movement within each brush box having grooves formed in the corners of the front face thereof to receive said finger means, and means biasing said brushes against said current collector member.

5. The dynamo electric machine set forth in claim 4 wherein said frame is formed with a pair of notches in one end thereof, and wherein said member is formed with a pair of laterally extending lugs disposed within said notches whereby when said end plate is attached to said frame said member will be clamped therebetween.

6. The dynamo electric machine set forth in claim 5 including a pair of spring elements overlying each of said lateral projections for engaging said end plates to apply pressure to said member upon attachment of the end plate to said frame.

7. A brush plate and brush box assembly for a dynamo electric machine including, a one-piece molded member of insulating material having an opening for receiving a current collector member and a pair of diametrically opposed brush boxes connecting with said opening, each brush box having a substantially open front wall with a plurality of longitudinally spaced brush engaging fingers extending partially across the front wall.

8. A brush plate and brush box assembly for a dynamo electric machine including, a one-piece member of insulating material having an opening for receiving a current collector member and a pair of diametrically opposed brush boxes connecting with said opening, each brush box having a substantially open front wall with a plurality of longitudinally spaced brush engaging fingers extending partially across the front wall and an axially offset shoulder spaced from the front wall so as to form a slot for guiding the active end of a brush spring.

9. The combined brush plate and brush box assembly set forth in claim 8 wherein said axially offset shoulder is formed with a notch for supporting the active end of the brush spring during insertion and removal of a current collector member in the opening of said assembly.

References Cited in the file of this patent

UNITED STATES PATENTS

| 1,271,863 | Dilg | July 9, 1918 |
| 1,618,877 | Henry | Feb. 22, 1927 |
| 1,991,356 | Anderson | Feb. 19, 1935 |
| 2,195,801 | Thibault | Apr. 2, 1940 |
| 2,663,810 | Stein | Dec. 22, 1953 |

FOREIGN PATENTS

| 229,951 | Germany | Jan. 12, 1911 |